United States Patent Office 2,820,800
Patented Jan. 21, 1958

2,820,800

REACTION OF METHYLENEBIS ACRYLAMIDE AND A FURANE AMINE

Gustav J. Martin, Philadelphia, Souren Avakian, Oreland, and Robert K. Preston, Hatboro, Pa., assignors to The National Drug Company, Philadelphia, Pa., a corporation of Delaware No Drawing. Application November 23, 1954
Serial No. 470,810

3 Claims. (Cl. 260—347.7)

This invention relates to and has for its object the provision of a novel series of chemical compounds (and salts thereof), as well as methods for their production. The compounds are derivatives of N,N'-methylenebis diamides and have been found to be extremely useful as hypotensive agents.

Although many agents have been employed heretofore for the purpose of reducing blood pressure, difficulties have arisen in their administration due to the fact that they are sometimes difficult to obtain in a reproducibly pure state and/or their administration must be carefully regulated due to possible toxic effects resulting from excessive administration. For example, although Alkavervir (a reproducible extract of *Veratrum viride*) has been found to effectively lower the blood pressure when administered intravenously, its use has at times resulted in salivation nausea and vomiting, with extreme overdosage leading to hypertension, bradycardia and collapse. Likewise, varied side effects are observed in the administration of certain quaternary ammonium compounds, such as hexamethylenebis-(trimethylammonium-chloride), especially when administered orally. Severe hypertension and peripheral circulatory collapse may occur in such oral administration. In addition, tolerance to the drug has been found to develop in some cases as a result of readjustments in the vascular system.

Among the more recent and effective hypotensive agents is 1-hydrazinophthalazine hydrochloride (Apresoline), but this compound, too, fails to give maximum effectiveness in the treatment of the disorder.

It has now been found that certain N,N'-methylenebis diamides (and salts thereof) provide an effective method for combating hypertension, with minimum toxicity. These compounds are the reaction products of an N,N'-methylenebis acrylamide with at least one mol of an aromatic-lower alkyl-amine. The heteroaromatic-lower alkyl-amines include 2-furanemethylamine (furfurylamine), benzylamine, dibenzylamine, beta-3,4-dimethoxyphenethylamine, phenethylamine, 2-furaneisopropylamine, 2-furanebutylamine, etc. The aromatic nuclei may, of course, contain additional ring substituents, such as alkyl (especially lower alkyl), halo or other groups. As illustrative of the effectiveness of these compounds, it has been found that intravenous injection of as little as 1 mgm./kg. of the reaction product of approximately equimolecular quantities of 2-furanemethylamine and N,N'-methylenebis acrylamide in phenobarbitalized dogs results in a 70–80 mm. drop in blood pressure with recovery in 1–2 hours; and no toxicity is observed in intravenous injection of as much as 200 mgm./kg. of the agent.

As indicated above, the compounds of the invention may be prepared by the reaction of N,N'-methylenebis acrylamide with at least 1 mol of the desired amine. When the reaction mixture is heated in the presence of a catalyst, such as copper sulfate, a crystalline product is obtained, which may be further purified, if desired, by recrystallization or other methods in accordance with standard procedures. Acid-addition salts of the bases may be prepared by reaction with any desired acid, such as hydrochloric, sulfuric, acetic, citric, tartaric, etc.; and quaternary ammonium salts may be obtained by reaction with the usual quaternizing agents, such as methyl chloride, methyl iodide, benzyl chloride, methyl sulfate, ethyl bromide, propyl chloride, etc.

The reaction is preferably carried out in the presence of an inert solvent such as water, ethanol, methanol, isopropanol, etc. Also other catalysts, such as sodium methoxide, sodium ethoxide, p-toluene sulfonic acid, copper acetate, etc. may be used in addition to copper sulfate to prepare the compounds of the invention. The compounds are best administered intravenously in solution. However, oral administration is also effective when the compounds are administered in the usual dosage unit forms (e. g. tablets, capsules, etc.). In tableting or encapsulating, the active agent in appropriate quantity (e. g. 10, 25, or 50 mg. etc.) may be incorporated in the desired filler, such as starch, lactose, etc., then pressed or encapsulated as desired.

Following are examples showing the methods of preparing novel products of this invention. It is to be specifically understood, however, that these examples are merely illustrative and not intended as restrictive of any of the embodiments of the invention.

Example 1

Approximately 30.8 g. N,N'-methylenebis acrylamide and 20 g. furfurylamine are dissolved in about 200 ml. water. A small amount of copper sulfate is added as a catalyst and the mixture is then heated on a steam bath for 1–3 hours. The resulting mixture is then filtered and the filtrate is allowed to cool and remain at room temperature until the white semi-crystalline product has been completely deposited. This product is then isolated by filtration. Fractional crystallization from ethanol or acetone-ethanol mixtures yields a purified product (M. P. 145–150° C.). [Treatment with hydrochloric acid yields the amine hydrochloride and treatment with methyl iodide yields the methiodide.]

Example 2

The procedure of Example 1 is followed except that 36.2 g. β-3,4-dimethoxyphenylethylamine is substituted for the furfurylamine of the reference example to obtain the corresponding diamide.

Example 3

Approximately 30.8 g. N,N'-methylenebis acrylamide is dissolved in 250 ml. methanol, at 50–60° C. A solution of 50 g. furfuryl amine dissolved in 50 ml. methanol is added along with 2 g. sodium methoxide. This warm solution is filtered for clarification, then allowed to remain at room temperature for several days. Upon evaporation, a crystalline deposit is obtained. The deposit is separated by filtration, then recrystallized from methanol to yield a purified product (M. P. 106–108° C.).

Example 4

A solution of 30 g. 2-thenylamine, p-toluene sulfonic acid, and 2 g. of 15 g. of N,N'-methylenebis acrylamide in 200 ml. 25% ethanol is heated on a steam bath for 4 hours. The mixture is then concentrated to dryness under reduced pressure, and the residue is dissolved in acetone and filtered. The desired diamide is precipitated as the hydrochloride by adding alcoholic hydrogen chloride to the acetone solution. Recrystallization from ethanol yields the purified diamide, M. P. 193–194°.

Example 5

A solution of 75 g. pyrrolidine and 50 g. N,N'-methylenebis acrylamide in 200 ml. ethanol is refluxed for 4 hours, then cooled and filtered. Fractional crystallization from ethanol yields the desired diamide, M. P. 152–153°.

This invention may be variously otherwise embodied within the scope of the appended claims.

What is claimed is:

1. The process which comprises reacting at elevated temperature in the presence of a catalyst of the group consisting of sodium methoxide, sodium ethoxide, p-toluene sulfonic acid, copper acetate, and copper sulfate, an N,N'-methylenebis acrylamide with at least one molecular equivalent of a furane-lower alkyl-amine.

2. The process of claim 1 wherein the amine is furfurylamine.

3. Products obtained by the process of claim 1.

References Cited in the file of this patent

UNITED STATES PATENTS

| | | |
|---|---|---|
| 2,569,409 | de Benneville et al. | Sept. 25, 1951 |
| 2,576,501 | Dalton | Nov. 27, 1951 |
| 2,576,502 | Dalton | Nov. 27, 1951 |
| 2,627,512 | Zerner et al. | Feb. 3, 1953 |